C. P. Marshall,

Fan Blower,

N° 16,547.

Patented Feb. 3, 1857.

Witnesses.
Saml L. Hough
W. H. L. Smith

Inventor.
Chester P. Marshall

UNITED STATES PATENT OFFICE.

CHESTER P. MARSHALL, OF FITCHBURG, MASSACHUSETTS.

IMPROVED FAN-BLOWER.

Specification forming part of Letters Patent No. 16,547, dated February 3, 1857.

*To all whom it may concern:*

Be it known that I, CHESTER P. MARSHALL, of Fitchburg, in the county of Worcester, in the State of Massachusetts, have invented a new and useful Improvement in Fan-Blowers; and I do hereby declare that the following is a full and exact description thereof, reference being had to the accompanying drawings, and to the letters of reference marked thereon and making a part of this specification.

To enable others skilled in the art to make and use my invention, I will proceed to describe its construction.

Figure 1:
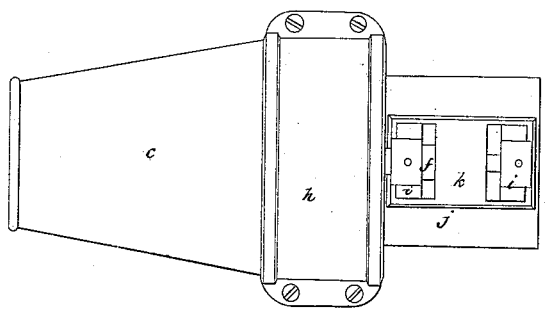
Figure 3:
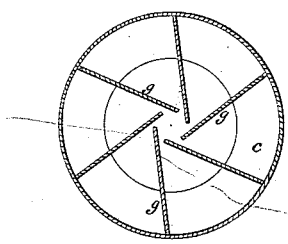
Figure 2:
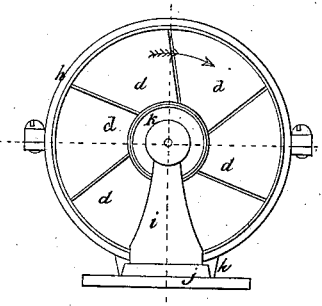
Figure 4:
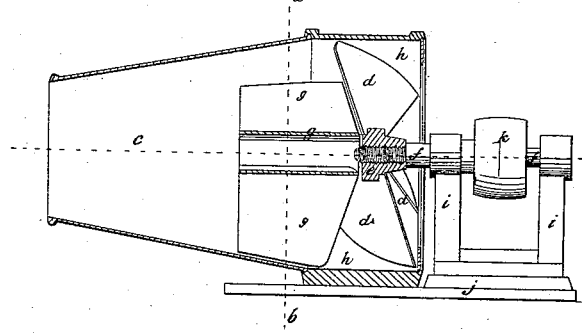
Figure 5:
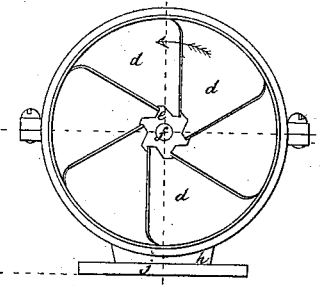

Figure 1 is a plan. Fig. 2 is an end elevation. Fig. 3 is a section at line $a\,b$, on Fig. 4, showing the stationary partitions $g$ in tube $c$. Fig. 4 is a sectional side elevation showing the interior of tube $c$ and the case $h$. Fig. 5 is an elevation with the tube $c$ removed, showing the fans in front.

The fans or wings $d$ are secured in a hub $e$ upon the end of a shaft $f$, making an angle of about forty-five degrees with the axis of the shaft $f$, said shaft being supported by a head-stock $i$, similar to those of a common lathe. The head-stock $i$ and the case $h$ are secured to a sole-plate $j$ by means of screws passing through the sole-plate into said parts. The shaft and fans are driven by a belt applied to a pulley $k$, causing them to rotate in the direction indicated by the arrow. The tube $c$ is secured to the case $h$ by means of a circumferential groove in $h$ and a corresponding projection around tube $c$, as shown in Fig. 4. The tube $c$, through which a current of air is forced by the rotating fans, is provided with fixed partitions $g$ convergingly and longitudinally placed in front of the fans, as shown in Figs. 3 and 4, the edges of the partitions next to the fans corresponding in form to the plane of revolution made by the front edges of the fans, the edges of the partitions and fans being nearly in contact, thereby preventing a rotation of the current of air next the fans and causing a greater strength of blast.

The well-known fact that rotating fans will cause the air to rotate and diverge has induced me to make the within-described improvement. Therefore

What I claim as my improvement, and desire to secure by Letters Patent, is the following:

The application of fixed partitions in the conducting air-tubes of fan-blowers, in the manner and for the purpose herein described, or in any other way which shall be substantially the same.

CHESTER P. MARSHALL.

Witnesses:
SAML. L. HAY,
W. H. L. SMITH.